(12) United States Patent
Bos

(10) Patent No.: US 8,274,405 B2
(45) Date of Patent: Sep. 25, 2012

(54) SYSTEM AND METHOD FOR DEVICE MANAGEMENT ON A DEDICATED SHORT-RANGE COMMUNICATION NETWORK

(75) Inventor: Jeremy Bos, Houghton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 750 days.

(21) Appl. No.: 12/203,276

(22) Filed: Sep. 3, 2008

(65) Prior Publication Data

US 2010/0052943 A1    Mar. 4, 2010

(51) Int. Cl.
- *G08G 1/123* (2006.01)
- *H04B 5/00* (2006.01)
- *H04B 1/06* (2006.01)
- *H04B 7/00* (2006.01)
- *H04W 24/00* (2009.01)

(52) U.S. Cl. ............ 340/991; 340/572.1; 340/10.1; 340/992; 340/993; 455/41.1; 455/41.2; 455/245.1; 455/246.1

(58) Field of Classification Search ............ None
See application file for complete search history.

(56) References Cited

U.S. PATENT DOCUMENTS

| | | | |
|---|---|---|---|
| 6,300,882 B1* | 10/2001 | Inoue | 340/933 |
| 7,181,229 B2* | 2/2007 | Singh et al. | 455/456.4 |
| 7,200,409 B1* | 4/2007 | Ichikawa et al. | 455/456.1 |
| 2003/0007467 A1* | 1/2003 | Sawada et al. | 370/329 |
| 2003/0143943 A1* | 7/2003 | Kline | 455/1 |
| 2005/0130723 A1* | 6/2005 | Grivas et al. | 455/575.9 |
| 2006/0164563 A1* | 7/2006 | Watanabe et al. | 348/731 |
| 2007/0040672 A1* | 2/2007 | Chinigo | 340/539.22 |

FOREIGN PATENT DOCUMENTS

JP    2005051386 A    * 2/2005

* cited by examiner

*Primary Examiner* — Jennifer Mehmood
*Assistant Examiner* — Fekadeselassie Girma
(74) *Attorney, Agent, or Firm* — Ingrassia Fisher & Lorenz, P.C.

(57) ABSTRACT

A method of managing a Dedicated Short-Range Communication (DSRC) network in a vehicle having a primary DSRC system is provided. The method comprises detecting a secondary DSRC system operating in proximity to the vehicle and transmitting a suppression notice in response to detecting the secondary DSRC system, where the suppression notice conveys an instruction to the secondary DSRC system to suspend DSRC transmissions.

22 Claims, 3 Drawing Sheets

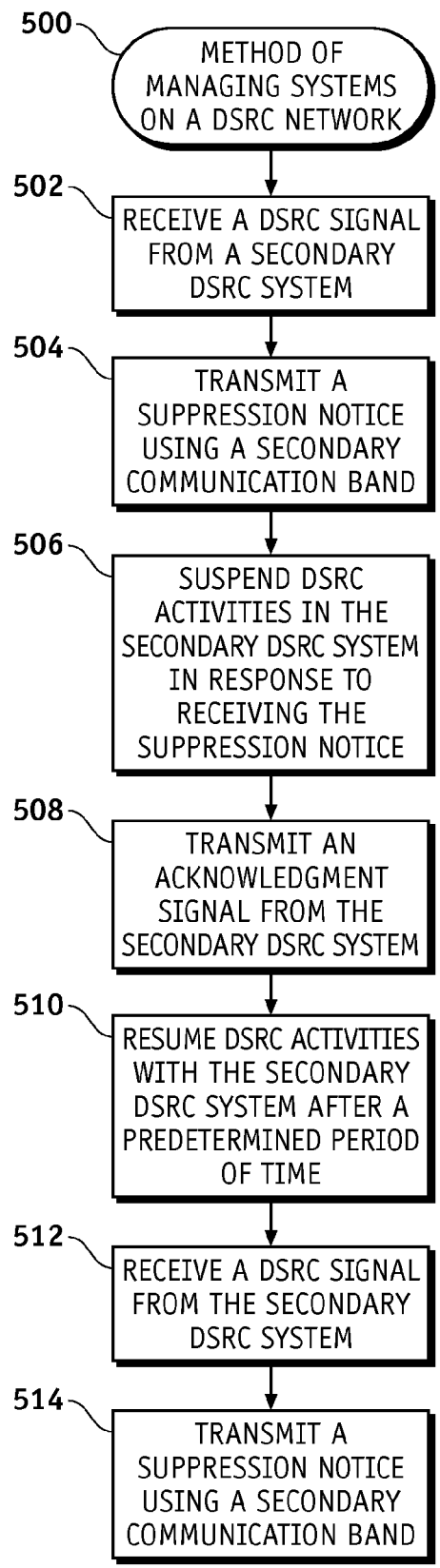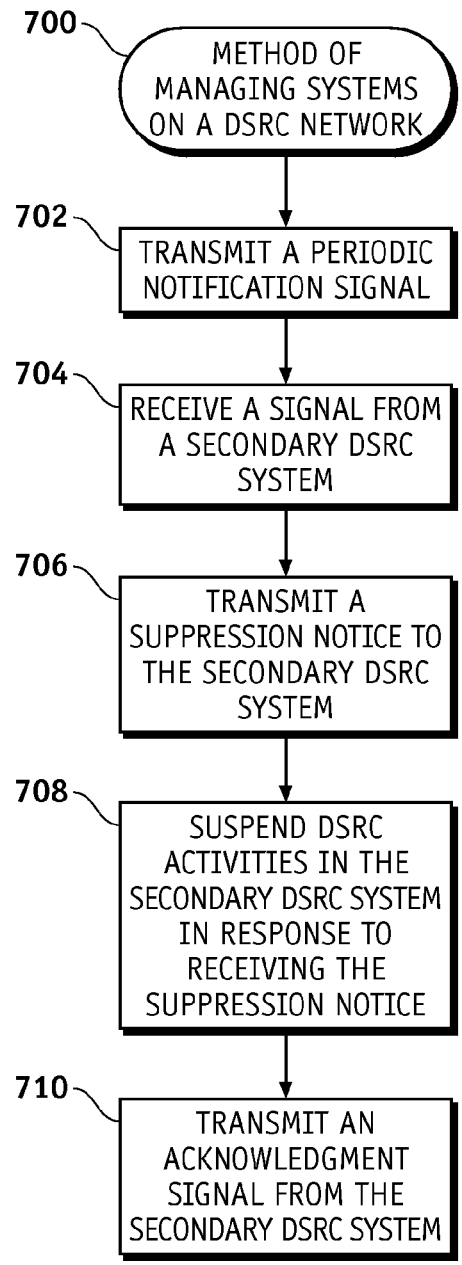
FIG. 2
FIG. 4

SYSTEM AND METHOD FOR DEVICE MANAGEMENT ON A DEDICATED SHORT-RANGE COMMUNICATION NETWORK

TECHNICAL FIELD

Embodiments of the subject matter described herein relate generally to interactions between devices on a Dedicated Short-Range Communications network (DSRC). More particularly, embodiments of the subject matter relate to managing multiple DSRC systems, including a vehicle-based DSRC system.

BACKGROUND

The potential use of Dedicated Short-Range Communication (DSRC) networks in a wide variety of applications will result in a proliferation of DSRC systems in various products and applications. Some products have specific, dedicated DSRC systems related to the product in which they are embodied. One example of such a system is a vehicle using DRSC for local communication with other vehicles and roadside stations. The vehicle can use DSRC to exchange information such as road conditions, toll information, traffic proximity, and the like.

Other systems, such as cellular phones, personal digital assistants (PDAs), mobile computers and the like, support DSRC use in a variety of applications. This is desirable because they are portable and multifunctional. Such devices, however, are frequently more limited in their capabilities in specific applications than dedicated systems. When both a portable and dedicated DSRC system are present for use in a particular application, however, it is preferable for only the dedicated DSRC systems to operate. Moreover, both types of DSRC systems can operate on the same wireless communication bands, which can result in interference or otherwise undesirable use of the communication bands. Accordingly, for functional reasons, as well as practical communication aspects, two simultaneously-operating DSRC systems can be not only less effective than a single, dedicated system, the operation of the second, non-dedicated system can degrade the effectiveness of the former.

BRIEF SUMMARY

A method of managing a Dedicated Short-Range Communication (DSRC) network in a vehicle having a primary DSRC system is provided. The method comprises detecting a secondary DSRC system operating in proximity to the vehicle and transmitting a suppression notice in response to detecting the secondary DSRC system, where the suppression notice conveys an instruction to the secondary DSRC system to suspend DSRC transmissions.

A vehicle-based primary DSRC system is also provided. The system comprises a DSRC transceiver adapted to transmit and receive DSRC signals on a DSRC network, and a DSRC controller adapted to operate the DSRC transceiver, where the DSRC controller is configured to detect a signal from a secondary DSRC system in proximity to the vehicle and to operate the DSRC transceiver to transmit a suppression notice in response to detecting the signal from the secondary DSRC system, where the suppression notice conveys an instruction to the secondary DSRC system to suspend DSRC transmissions.

A primary DSRC system is also provided. The system comprises a DSRC transceiver adapted to transmit and receive DSRC signals on a DSRC network, and a DSRC controller adapted to operate the DSRC transceiver to transmit a periodic notification signal, where the periodic notification signal conveys primacy of the primary DSRC system to nearby secondary DSRC systems adapted to operate on the DSRC network.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 is a schematic illustration of a method of managing local systems on a DSRC network;

FIG. 4 is a schematic illustration of a still another method of managing local systems on a DSRC network.

DETAILED DESCRIPTION

Figure 1:
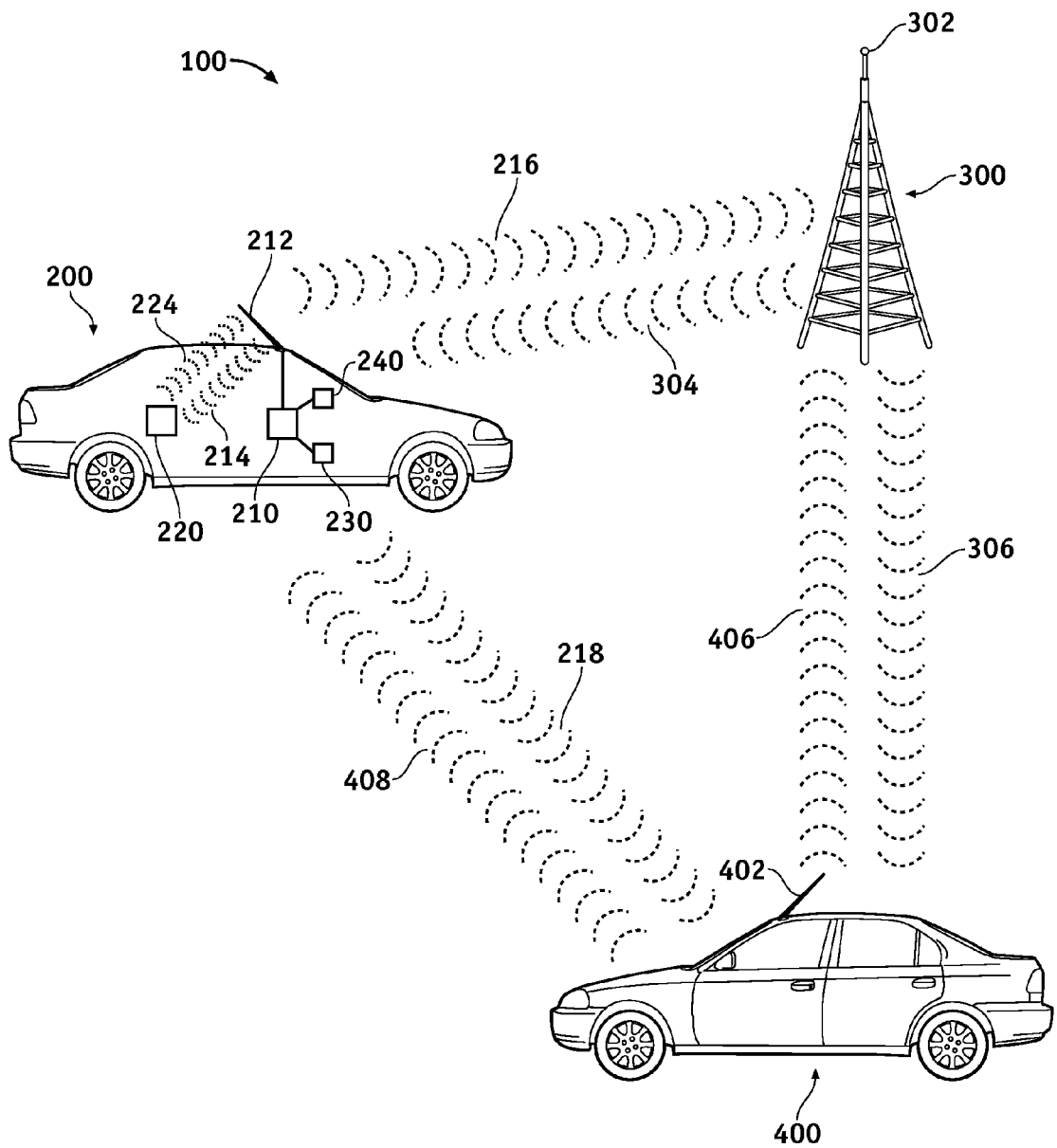
FIG. 1 is a schematic representation of operating devices in a vehicular DSRC system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, wireless transmitters and/or receivers, look-up tables, or the like, which may carry out a variety of functions under the control of one or more microprocessors or other control devices.

In addition, certain terminology may also be used in the following description for the purpose of reference only, and thus are not intended to be limiting. For example, terms such as "local", "near", "distant", and "remote" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order or numerical limitation unless clearly indicated by the context.

Dedicated Short-Range Communications (DSRC) can be utilized, in one well-known embodiment, with a vehicular security system. Through the use of a DSRC security system, vehicles can exchange, through secure communication methods, information about themselves and nearby vehicles. To a vehicle using its host DSRC security system, nearby vehicles can be considered "remote" vehicles for purposes of determining whether vehicle information is being generated by the selfsame vehicle or arriving from another source. Through the use of DSRC, a vehicle can communicate some or all of the information determined by its own DSRC controller to other vehicles. The controller can operate under a set of instructions through software or firmware or the like, to monitor the vehicle for any of a set of conditions that can lead to transmission of information to other vehicles.

As a non-limiting example, sudden braking of the vehicle can be detected by one or more sensors of the vehicle and that information can be in turn provided to the controller. The controller can, as one non-limiting example of an operation, create a signal informing nearby, DSRC-participating vehicles of the action by transmitting vehicle information data. A vehicle would receive such a transmission as remote vehicle information data. Additionally, the controller can activate a visual, audio, or tactile cue. Such a cue can convey information to an occupant of the vehicle, communicating the information received from the remote vehicle.

Another example of DSRC use is toll devices. Toll roads can have DSRC systems disposed above or adjacent the roadway to make toll collection more convenient. Typically in such systems, the vehicle contains a toll device or transponder which conveys information to the toll collection DSRC systems. Such information can include the identity of the toll device's owner and/or an account balance, from which a toll for the vehicle's passage can be debited. Toll systems using such devices are well-known in the art.

FIG. 1 illustrates an embodiment of a DSRC network 100 comprising a vehicle 200, a roadside DSRC station 300, and a remote vehicle 400. Other entities can participate, and the number of components of the network is not restricted to the illustrated components. More or fewer vehicles and/or stations, as well as different types of participants can be used on various networks.

The vehicle 200 can comprise, among other features and components, a DSRC controller 210, a DSRC transceiver 212, and a sensor system 230. A secondary DSRC system 220 can also be present in the vehicle 200. The roadside DSRC station 300 comprises a DSRC transceiver 302, which is preferably compatible with DSRC transceiver 212. The roadside DSRC station 300 can comprise other components as well, including other networking systems, wireless systems, computer and/or controller systems, and the like. The remote vehicle 400 comprises a second DSRC controller 402, designated a "remote" DSRC controller for ease of reference. The remote vehicle 400 can further comprise other systems and components, which may be suitably configured to support conventional features and functions that need not be described in detail here.

Each of the vehicle 200, roadside DSRC station 300, and remote vehicle 400 can communicate with each other using wireless signals 216, 218, 304, 306, 406, 408. In this regard, the vehicle 200, roadside DSRC station 300, and remote vehicle 400 represent the DSRC network 100 in this example. The DSRC controller 210 is suitably configured to cause the secondary DSRC system 200 to temporarily disable or suspend its DSRC functions as needed. In practice, this feature allows the system to inhibit the secondary DSRC system 220 from degrading the operation or effective communication of the dedicated DSRC controller 210, as described below.

The vehicle 200 participating on a DSRC network 100 can be of any type. Thus, although the vehicle 200 is an automobile in the illustrated embodiment, other vehicles can be used. Such vehicles can be private or commercial, and include such examples as aircraft, watercraft, trains, and so on. The DSRC network 100 described can operate as described with respect to automobiles, or can function as appropriate to the type of participating vehicles.

As mentioned, the vehicle 200 can preferably comprise a DSRC transceiver 212 coupled to a DSRC controller 210. The DSRC controller 210 and DSRC transceiver 212 can be adapted to work with the vehicle 200 to perform DSRC functions related to vehicular operation. Vehicular operations can occur in isolation and/or in conjunction with surrounding vehicles, such as the remote vehicle 400, through the use of the DSRC network 100. The DSRC controller 210 is preferably adapted and configured to operate the DSRC transceiver 212 to communicate wirelessly with neighboring DSRC systems.

The DSRC controller 210 can be coupled to the DSRC transceiver 212 and the vehicle's sensor system 230. The DSRC controller 210 can perform various features appropriate to participating in a DSRC network 100. Because the DSRC controller 210 is disposed in the vehicle 200, it is preferably adapted to interoperate with one or more aspects of the vehicle 200, such as through data obtained from the sensor system 230, when participating in the DSRC network 100. Such participation can include determining information regarding the vehicle 200 and transmitting it to remote DSRC systems, as well as receiving information from the remote DSRC systems.

As mentioned, the vehicle 200 can further comprise a sensor system 230 coupled to the DSRC controller 210. The sensor system 230 can comprise any number of sensor types performing a variety of operations. Such sensor types can include temperature sensors, pressure sensors, gyroscopic sensors, accelerometers, short-range radar and/or remote positioning sensors, GPS receivers, near-field sensing systems, and the like. The sensors can be adapted to monitor and report on various operations of the vehicle, such as its speed, accelerator and/or brake position, acceleration and/or braking status, travel direction, and so on.

The sensor system 230 and, in turn, the DSRC controller 210, can receive input such as engine coolant temperature, tachometer measurements, speedometer readings, tire pressure readings, collision detection sensors, seatbelt usage detectors, and other sources. Thus, the sensor system 230 preferably includes sensors useful in obtaining status and characteristics about the vehicle and its operational state. The sensor system 230 can be coupled to other components as well as the DSRC controller 210. Interaction between the DSRC controller 210 and sensor system 230 can be through the cooperation of intermediary components, such as a computing system, as appropriate to the embodiment.

The DSRC controller 210 can also couple to a feedback system 240 comprising such feedback components as audio, visual, or tactile devices. The output devices can be visible, audible, or tactilely perceptible to the operator of the vehicle or other occupants of the vehicle. Some feedback systems 240 can include clear or colored lighting components, such as LEDs, incandescent lamps, LCD displays, Heads Up Displays (HUDs), piezoelectric buzzers or speakers, car stereo devices, vibration devices, though other devices are possible.

Thus, the DSRC controller 210 can obtain data from the sensor system 230 and provide operational data regarding the vehicle 200 to surrounding automobiles and/or transmission stations. Additionally, in response to receiving certain information from remote DSRC sources, the DSRC controller 210 can operate one or more elements of the feedback system 240 to convey information to the operator of the vehicle 200, or other occupants.

In some embodiments, the DSRC transceiver 212 can be only a receiver, with one or more receiving antennas, through preferably the DSRC transceiver 212 is operable to both receive and transmit DSRC signals. The DSRC transceiver 212 is preferably capable of wirelessly transmitting and receiving signals suitable for use in a DSRC network. Such signals can be transmitted using radio-frequency methods. Preferably, the DSRC transceiver 212 is also adapted to receive and transmit signals using other techniques and protocols as well, including, but not limited to, BLUETOOTH™ signals, very low frequency (VLF) signals, radio-frequency signals at other frequencies or in other modes, and near-field wireless signals. Further more, the DSRC transceiver 212 is preferably adapted to utilize appropriate encoding and/or encrypting technologies, such as spread-spectrum techniques and/or cryptographic security. Such techniques can be performed in cooperation with the DSRC controller 210.

Thus, the DSRC controller 210 can operate the DSRC transceiver 212 to transmit signals containing information derived from the sensor system 230. Transmissions 216, 218 depict signals sent from the vehicle 200 by the DSRC transceiver 212 and received by the roadside DSRC station 300, and the remote vehicle 400, respectively. The DSRC controller 210 can also receive information from nearby remote network participants through the DSRC transceiver 212. Thus, transmissions 304, 408 sent to the vehicle 200 from the roadside DSRC station 300 and remote vehicle 400, respectively, can be received by the DSRC transceiver 212 and provided to the DSRC controller 210. When appropriate, the DSRC controller 210 can operate one or more components of the feedback system 240 to produce a signal or cue for an occupant of the vehicle 200 in response to information received.

The roadside DSRC station 300 can comprise a roadside DSRC transceiver 302 for use in participating in the DSRC network 100. The roadside DSRC station 300 is preferably capable of receiving, examining, and relaying DSRC signals from vehicles within its effective reception and transmission range. The roadside DSRC station 300 can also receive data from and transmit data to other stations, networks, and devices, such as satellites, other roadside stations, and other, non-DSRC information networks to exchange information as appropriate for uses therein. For example, a distant weather service (not shown) can communicate a bulletin to the roadside DSRC station 300 using a transmission through a satellite system or the Internet. The roadside DSRC station 300 can then transmit the weather bulletin to nearby vehicles with the roadside DSRC transceiver 302. Signal 304 represents a transmission from the roadside DSRC station 300, while signal 306 represents a transmission to the remote vehicle 400.

The remote vehicle 400 is another vehicle present in the proximity of the vehicle 200. The remote vehicle 400 can be travelling, or stopped. The remote vehicle 400 comprises a remote vehicle DSRC transceiver 402 for use in the DSRC network 100. The remote vehicle 400 can be participating in the DSRC network 100 in a manner similar to vehicle 200.

As mentioned previously, portable DSRC devices will become more widespread soon. In the illustrated embodiment, a secondary DSRC system 220 is disposed in the vehicle 200. The secondary DSRC system 220 can be embodied in a cellular phone, personal digital assistant (PDA), or other portable device, including a combination of such devices. A user, the driver, or an occupant can introduce the secondary DSRC system 220 into the DSRC network 100 by carrying it into the vehicle 200.

The secondary DSRC system 220 can communicate with the DSRC transceiver 212 by transmitting signals 224 to it, and receiving signals 214 from it. Although the secondary DSRC system 220 can communicate with the DSRC transceiver 212 using transmissions on the DSRC communication band, frequently, the secondary DSRC system 220 can communicate using other wireless techniques as well. Some techniques can include BLUETOOTH™ communication, near-field communication, radio-frequency communication, VLF communication, infrared communication, and so on. Where signals are exchanged between the DSRC transceiver 212 and the secondary DSRC system 220 using a communication channel, band, or method other than that used for primary communications in the DSRC network 100, they can be said to occur using a secondary communication band, channel, or technique distinct from the DSRC network 100.

Because the illustrated embodiment depicts the secondary DSRC system 220 in a suspended or suppressed operational state, signals are not shown between it and remote components of the DSRC network 100, such as the roadside DSRC station 300 and remote vehicle 400. Under certain circumstances, however, the secondary DSRC system 220 can exchange signals with the roadside DSRC station 300 and remote vehicle 400, as appropriate.

It can be advantageous, under certain circumstances, to utilize DSRC capabilities of the secondary DSRC system 220. For example, in a vehicle without a dedicated DSRC system, the presence of the secondary DSRC system 220 can fulfill at least some functions of a dedicated DSRC system. One such example can be communication with toll devices on toll roads. Some vehicles can maintain information regarding the usual operator's identity and/or toll account balance. Likewise, some secondary DSRC systems can be used for this purpose. In a vehicle without a dedicated DSRC system, the secondary DSRC system 220 can perform exchanges with wireless toll devices to permit easy use of toll roads.

Under other circumstances, however, it can be advantageous to inhibit DSRC functions of secondary DSRC systems when present in a vehicle with a dedicated DSRC system. Continuing the example above, where the owner of the secondary DSRC system is present in another vehicle as an occupant, rather than as the operator of their own vehicle, it would be preferable for the dedicated DSRC system to assert primacy in the DSRC network, and perform operations instead of the secondary DSRC system. Thus, the occupant's secondary DSRC system would not perform exchanges with toll devices when a dedicated DSRC system is present.

Different techniques can be used to suspend DSRC operations of a secondary DSRC system in communication range of a vehicle's DSRC system. In accordance with a first technique, the DSRC controller 210 can monitor the DSRC network 100 for the presence of the secondary DSRC system 220. After detecting its presence, the DSRC controller 210 can transmit a suppression notice to the secondary DSRC system 220 using a secondary communication channel (that does not rely on the DSRC network).

In accordance with a second technique, after the DSRC controller 210 detects the presence of a secondary DSRC system 220, it can communicate with the secondary DSRC system 220 directly over the DSRC communication band.

Examples of such communication can include the transmission of a suppression notice or a negotiation session during which the DSRC controller 210 and secondary DSRC system 220 establish which DSRC system will operate as the primary DSRC system, and which will be suppressed, suspended, or otherwise inhibited from operating.

In accordance with a third technique, the DSRC controller 210 can transmit a periodic notification signal, transmitted similar to a heartbeat signal on a repeated, interval, informing the nearby secondary DSRC system 220 as to the presence and operation of the DSRC controller 210. The secondary DSRC system 220 can be adapted to disable or suspend one or more of its DSRC features in response.

Figure 3:
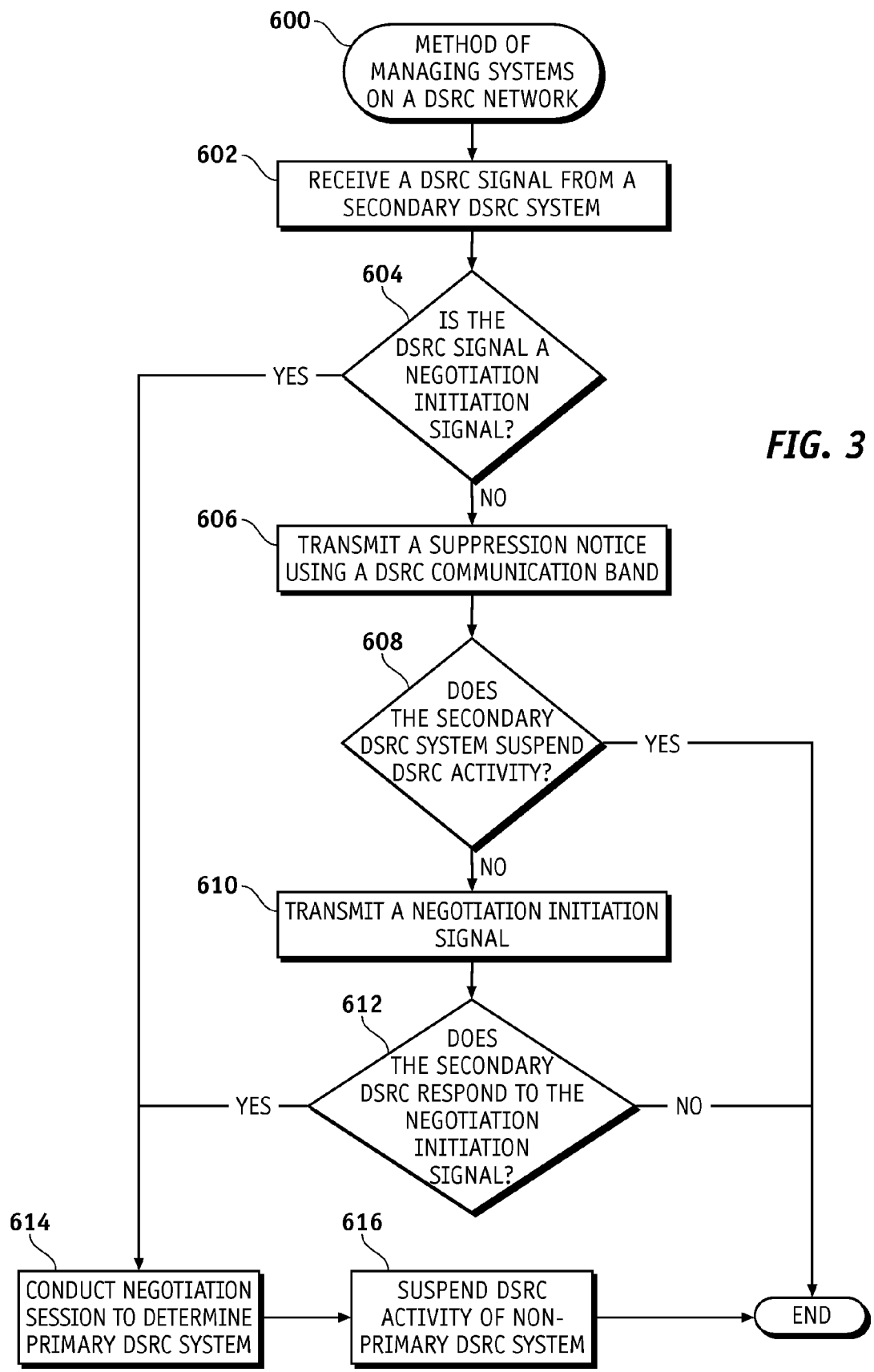
FIG. 3 is a schematic illustration of another method of managing local systems on a DSRC network.

FIGS. 2-4 illustrate schematic depictions of the operation of the techniques described above. Each is described in the context of the DSRC network 100 from FIG. 1. In practice, portions of methods 500, 600, 700 may be performed by different elements of the described system, e.g., a vehicle, a DSRC transceiver, or a DSRC controller. The various tasks performed in connection with methods 500, 600, 700 can be performed by software, hardware, firmware, or any combination thereof. It should be appreciated that methods 500, 600, 700 may include any number of additional or alternative tasks, the tasks shown in FIGS. 2-4 need not be performed in the illustrated order, and methods 500, 600, 700 may be incorporated into a more comprehensive procedure or process having additional functionality not described in detail herein.

FIG. 2 illustrates a method of practicing the first technique. During operation, the DSRC transceiver 212 can receive (task 502) a signal 224 from the secondary DSRC system 220. The signal 224 can be on a DSRC communication band or it may be transmitted through the use of a secondary communication channel capable of reception by the DSRC transceiver 212. Preferably the signal 224 can include information regarding the identity, purpose, and functions of the secondary DSRC system 220 sufficient for the DSRC controller 210 to determine it is a secondary DSRC system 220. Such factors as the strength of the signal 224 and type of communication can permit the DSRC controller 210 to conclude the secondary DSRC system 220 is disposed in sufficient proximity, such as sufficiently near or within the vehicle 200, that it should be suppressed. For example, detection of a low-power, short-range transmission in a non-DSRC format can lead to the conclusion that a secondary DSRC system 220 is near or within the vehicle 200. As another example, DSRC transmissions which identify the transmitter as a certain type of device, such as a cellular phone, can be categorically classified as secondary DSRC systems by the DSRC controller 210. Additionally, encounters with secondary DSRC systems can be recorded and stored by the DSRC controller 210, aiding in recognition of the same systems in future encounters.

In response to detecting the secondary DSRC system 220, such as by receiving a signal therefrom, the DSRC controller 210 can operate the DSRC transceiver 212 to transmit (task 504) a suppression notice or suppression signal. The suppression notice can be transmitted on any communication channel, including a secondary communication band or channel. The suppression notice can convey to the secondary DSRC system 220 information instructing, requesting or requiring it to suspend, disable, or discontinue certain functions and operations, preferably including DSRC transmissions, thereby reducing interference with the operation of the DSRC controller 210. The suppression notice can be in a standard format, facilitating interaction between the DSRC controller 210 and various types of secondary DSRC systems embodied or disposed in different device types and performing different operations or functions. Preferably, a suppression notice identifies the secondary DSRC system 220 so as to prevent inadvertent suppression of other systems on the DSRC network 100. In certain embodiments, the DSRC controller 210 can repeat the suppression notice using different secondary communication channels as part of the transmitting step (task 504).

Preferably, the secondary DSRC system 220 receives the suppression notice and suspends (task 506) its DSRC activity. In some embodiments, the secondary DSRC system 220 can transmit (task 508) an acknowledgement signal, indicating reception of the suppression notice and responsiveness to the instruction conveyed therein. In certain embodiments, where the DSRC controller 210 is configured to practice multiple techniques of suppressing the secondary DSRC system 220 as described below, the acknowledgment signal can indicate that alternative techniques need not be practiced. Conversely, in such embodiments, the DSRC controller 210 can practice one or more of the alternative methods in response to the lack of reception of an acknowledgement signal after a predetermined period of time.

The suppression notice can include a time period after which the secondary DSRC system 220 can resume (task 510) DSRC operation. In some embodiments, the DSRC controller 210 can keep a record of the time of transmission of suppression notices and refresh them by sending new suppression notices as appropriate. In some embodiments, the DSRC controller 210 can perform search or detection operations to determine if the secondary DSRC system 220 is present in on the DSRC network 100 prior to re-sending a suppression notice. In certain embodiments, the DSRC controller 210 can delay until after a suppression notice's expiration to determine if new DSRC activity from the secondary DSRC system 220 will be received (task 512). If the DSRC controller 210 receives a DSRC signal from the secondary DSRC system 220, it can again transmit (task 514) a suppression notice. If the secondary DSRC system 220 has been removed from the proximity of the vehicle 200 prior to the end of its suppression period, the method 500 will end with task 510, when the secondary DSRC system 220 resumes normal DSRC activity and/or operation.

As mentioned, the suppression notice can be transmitted (task 504) utilizing a secondary communication channel to inhibit interference with other DSRC traffic on the DSRC network 100. The secondary communication channel can be any of those previously described, including but not limited to low-power, short-range signals, VLF signals, radio-frequency signals, near-field signals, or another signal which the DSRC transceiver 212 is capable of transmitting and, preferably, the secondary DSRC system 220 can receive. Although transmissions using the BLUETOOTH™ protocol can be considered low-power, short-range signals, including Class 1 BLUETOOTH™ devices, other types of signals are also contemplated.

A method 600 of managing DSRC systems on a DSRC network in accordance with the second technique is illustrated in FIG. 3. As described above, the DSRC controller 210 can receive (task 602) a signal from the secondary DSRC system 220. After receiving (task 602) the DSRC signal from the secondary DSRC system 220, the DSRC controller 210 can determine (task 604) whether the signal was a negotiation initiation signal.

A negotiation initiation signal can convey sufficient information to the receiving system for it to establish a negotiation session between the transmitting and receiving DSRC systems in response. The receiving DSRC system can reply with a negotiation response signal to establish the negotiation session. Conducting (task 614) such a negotiation session between the DSRC controller 210 and the secondary DSRC system 220, can comprise the systems 210, 220 exchanging information to determine which system should be the primary DSRC system, and which should be suppressed, suspended, or otherwise temporarily disabled from at least some specified DSRC operation. Preferably, dedicated DSRC systems will establish primacy, or primary operating status, during negotiation sessions, at least for those functions, features, and/or operations for which they benefit from superior capabilities over secondary DSRC devices. The negotiation session can follow a standard protocol for DSRC exchanges.

Where possible, the negotiation session occurs utilizing a secondary communication channel, reducing DSRC traffic. In certain embodiments, a suppression notice can be interpreted as an abbreviated negotiation session, during which the DSRC controller 210 asserts primacy and the secondary DSRC system 220 acquiesces by suspending certain operations.

Thus, where it the DSRC controller 210 determines (task 604) that the DSRC signal received (task 602) comprises a negotiation initiation signal, the DSRC controller 210 and secondary DSRC system 220 can conduct (task 614) the session. Subsequently, after a primary DSRC system, preferably the DSRC controller 210, has been determined, the non-primary DSRC system, preferably the secondary DSRC system 220, will suspend (616) DSRC activity.

If the DSRC controller 210 determines (task 604) that the received DSRC signal was not a negotiation initiation signal, it can transmit (task 606) a suppression notice using a DSRC communication band. Following the transmission (task 606), the DSRC controller 210, in some embodiments, monitor the DSRC network 100 for a predetermined length of time to determine (task 608) whether the secondary DSRC system 220 has suspended DSRC activity. Preferably, if no further DSRC signals are received from the secondary DSRC system 220 during the predetermined length of time, the DSRC controller 210 can conclude that the secondary DSRC system 220 has suspended DSRC activity. In some embodiments, rather than monitoring the DSRC network 100, the DSRC controller 210 can determine (task 608) suspension of DSRC activities by the secondary DSRC system 220 by reception of an acknowledgement signal, as described above.

In the event the DSRC controller 210 receives further DSRC signals from the secondary DSRC system 220, it can transmit (task 610) a negotiation initiation signal in an attempt to resolve primacy on the DSRC network 100. After transmitting (task 610) the signal, the DSRC controller 210 can determine (task 612) whether the secondary DSRC system 220 responds in a suitable fashion to establish the negotiation session. Preferably, the secondary DSRC system 220 responds to the negotiation initiation signal, and the systems 210, 220 conduct (task 614) a negotiation session as described above.

In some circumstances, however, the secondary DSRC system 220 can ignore or fail to respond to any and all signals from the DSRC controller 210, including suppression notices and negotiation signals. Such a situation is not a desired outcome, and preferably multiple techniques can be used in combination to suppress the secondary DSRC system 220, as discussed in greater detail below.

The DSRC controller 210 can also practice the third technique by operating in a manner depicted by FIG. 4. Unlike previous methods 500, 600, method 700 can operate in the absence of detection of secondary DSRC systems. Preferably, the DSRC controller 210 transmits (task 702) a periodic notification signal conveying information indicating its presence and/or operational features to nearby secondary DSRC systems. The periodic notification signal can be similar to heartbeat signals in other systems, notifying cooperating components to the presence and operation of the transmitting component.

In certain embodiments, the notification signal can be repeated according to a specified time interval, such as every 1 second, or fraction thereof. Such periods can be as small as 0.001 seconds, and every interval up to and including 1.0 seconds. Periods longer than 1 second can be practiced as well, such as a notification signal sent every 10 seconds, every 60 seconds, and so on.

If a DSRC controller 210 receives (task 704) a signal from a secondary DSRC system, despite transmission (task 702) of a periodic notification signal, the DSRC controller 210 can transmit (task 706) a suppression notice utilizing a DSRC communication band and/or secondary communication band, as appropriate to the embodiment. Preferably, the secondary DSRC system 220 will receive the suppression notice and suspend (task 708) DSRC activities in response. In some embodiments, the secondary DSRC system 220 can transmit (task 710) an acknowledgement signal, receivable by the DSRC controller 712, conveying information indicative of suspension of DSRC activities.

Certain aspects of the techniques and methods described herein are not exclusive, and can be practiced in combination as well. As one example of such a combination, a DSRC controller 210 can be configured and/or adapted to transmit a periodic notification signal, as described with respect to FIG. 4. In the event a secondary DSRC system is detected within or near the vehicle 200 despite the notification signal, the DSRC controller 210 can practice either method 500, 600 as previously described, or portions thereof.

As another example, a DSRC controller 210 practicing method 500 can encounter a secondary DSRC system 220 which does not respond to suppression notices sent using various secondary communication bands. In certain embodiments, the DSRC controller 210 can then utilize the DSRC communication band for transmission of a suppression notice, in accordance with some steps described in method 600.

As still another example, a DSRC controller 210 practicing method 600 can transmit a suppression notice by utilizing one or more secondary transmission bands in accordance with method 500 prior to transmitting the suppression notice utilizing the DSRC communication band in task 606. Other combinations of functions, techniques, and practices are contemplated.

Under certain circumstances, the DSRC controller 210 will not be the desired primary DSRC system for the vehicle, even though it is a dedicated system. As one example, when a DSRC system is using secure communication methods, such as public key encryption, it can transmit data corresponding to a certificate identifying itself. The certificate containing such data can be useful or essential to proper DSRC operation. In some situations, the certificate used by the dedicated DSRC system can be expired or otherwise invalid. In such a situation, the secondary DSRC system can transmit a certificate invalidity notice and assert primacy during a negotiation session. In response, the dedicated vehicular DSRC system can reverse normal operations and instead suppress itself in favor of the secondary DSRC system. Under such circumstances, the DSRC controller 210 preferably provides useful feedback to the vehicle's operator by operating one or more components of the feedback system 240.

The suppression of the DSRC controller 210 can be preferable under other circumstances well. One such example occurs when a toll device, encountered as a secondary DSRC system, contains more current information and/or is linked to a more desirable toll account. Accordingly, the DSRC controller 210 is preferably suppressed, at least for toll collection functions, in favor of the secondary DSRC system. Such configuration can be manually accomplished, or, in some embodiments, the secondary DSRC system can be configured to automatically assert primacy, at least as to toll operations. In some embodiments, the DSRC controller 210 can be configured to suppress toll functions when communicating and/or cooperating with a toll device on the DSRC network 100. Such a toll device can be paired with the vehicle and/or the DSRC controller 210 by manual input, thereby identifying it to the DSRC controller 210, which can store the identification for future use.

In such circumstances where it is desirable to have a secondary DSRC system replacing some functions or features of a dedicated vehicular system, the outcome of a negotiation session can result in primacy of the secondary DSRC system. Thus, although a dedicated DSRC system can assert primacy during a negotiation session, certain situations can cause the negotiation session to terminate with a secondary DSRC system acting as a primary DSRC system.

Additionally, the response of the secondary DSRC system 220 to the notification signal can be selective. Thus, the secondary DSRC system 220 can obtain from the notification signal information as to which functions or features the DSRC controller 210 is performing. Where the secondary DSRC system 220 does not conflict, overlap, inhibit, or interfere with those functions and/or features, it can remain operational.

For example, if the DSRC controller 210 did not provide location information using GPS devices or other such positioning systems, it is reasonable to expect that it will not operate one or more components of the feedback system 240 to convey driving instructions to the operator of the vehicle 200. Accordingly, a notification signal transmitted from the DSRC controller 210 will not include notice of the use of GPS or other driving-assistance features. Therefore, the secondary DSRC system 220 can perform those operations, if capable, without conflicting with the primary, dedicated DSRC controller 210 of the vehicle 200. Of course, user configuration can override this option, requiring complete suspension of operation once a notification signal is received. Similarly, the user can configure the secondary DSRC system 220 to operate even after receiving a notification signal. While providing the option to a user is preferable, the user exercising it is not.

In certain circumstances, the DSRC controller 210 can experience one or more situations during which the scope of its DSRC operations can change. For example, if a weather-emergency bulletin is received, the DSRC controller 210 can begin exchanging information with a more frequently-updated weather information service. Such operation can cause the DSRC controller 210 to perform more or different DSRC operations. Consequently, the DSRC controller 210 can adjust the content of the notification signal to reflect the expanded or altered operations it is undertaking. In response, the secondary DSRC system 220 can adjust its operation. Continuing the example, the secondary DSRC system 220 can suspend or suppression its activities related to frequent weather updates where they would conflict with, cause interference with, or otherwise degrade the performance of the DSRC controller 210. Thus, the notification signal and the secondary DSRC system's 220 response can be adaptable to the circumstances.

Although three approaches are described in detail for disabling, suspending, or otherwise inhibiting secondary DSRC system use when in a vehicle with a DSRC system, they are not mutually exclusive and can be used in combination with each other. Moreover, other techniques can be practiced, such as manual disablement of DSRC features in the secondary DSRC system 220. Additionally, any of the techniques discussed can be adjusted by user input. For example, a vehicle's DSRC system can be configured not to suppress a specific secondary DSRC system present in the vehicle, or not to suppress any secondary DSRC systems, or which method to use to suppress a specific secondary DSRC system, and so on. Thus, the operator of the vehicle and/or secondary DSRC system can configure operation of the present DSRC systems as desired. Such configuration can override automatic settings, if desired, such as returning a secondary DSRC system to normal operations after the secondary DSRC system receives a suppression notice, even if the designated time interval has not elapsed.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of managing a Dedicated Short-Range Communication (DSRC) network in a vehicle having a primary DSRC system, the method comprising:
   detecting a secondary DSRC system that is operating in proximity to the vehicle;
   transmitting a suppression notice from the primary DSRC system to the secondary DSRC system in response to detecting the secondary DSRC system, where the suppression notice conveys an instruction to the secondary DSRC system to suspend DSRC transmissions of the secondary DSRC system, wherein the suppression notice comprises a time period after which the secondary DSRC system is permitted to resume DSRC transmissions; and
   suspending, at the secondary DSRC system in response to the instruction conveyed in the suppression notice, DSRC transmissions of the secondary DSRC system;
   wherein suspending, at the secondary DSRC system in response to the instruction conveyed in the suppression notice, DSRC transmissions of the secondary DSRC system, comprises:
   causing the secondary DSRC system to enter a suspended operational state in response to the instruction conveyed in the suppression notice, wherein the secondary DSRC system suspends DSRC operations of the secondary DSRC system and does not transmit DSRC transmissions during the suspended operational state to prevent interference with DSRC transmissions of the primary DSRC system.

2. The method of claim 1, wherein transmitting the suppression notice comprises transmitting the suppression notice utilizing a secondary communication channel distinct from the DSRC network.

3. The method of claim 2, wherein utilizing a secondary communication channel comprises transmitting the suppression notice utilizing a radio-frequency communication band.

4. The method of claim 2, wherein utilizing a secondary communication channel comprises transmitting the suppression notice utilizing a low-power, short-range wireless communication band.

5. The method of claim 2, wherein utilizing a secondary communication channel comprises transmitting the suppression notice utilizing a near-field communication band.

6. The method of claim 1, wherein transmitting the suppression notice comprises transmitting the suppression notice on a DSRC communication band of the DSRC communication network.

7. The method of claim 1, further comprising:
receiving a certificate invalidity notice from the secondary DSRC system in response to transmitting the suppression notice; and
operating the primary DSRC system in a secondary role on the DSRC network in response to receiving the certificate invalidity notice.

8. The method of claim 7, further comprising providing feedback to an operator of the vehicle in response to receiving the certificate invalidity notice.

9. The method of claim 1, wherein the secondary DSRC system comprises a cellular phone.

10. A vehicle-based primary Dedicated Short-Range Communication (DSRC) system comprising:
a DSRC transceiver configured to transmit and receive DSRC signals on a DSRC network; and
a DSRC controller configured to operate the DSRC transceiver, where the DSRC controller is configured to detect a signal from a secondary DSRC system in proximity to the vehicle and to operate the DSRC transceiver to transmit a suppression notice in response to detecting the signal from the secondary DSRC system, where the suppression notice conveys an instruction to the secondary DSRC system to suspend DSRC transmissions, wherein the suppression notice comprises a time period after which the secondary DSRC system is permitted to resume DSRC transmissions, and wherein the secondary DSRC system is configured to suspend DSRC transmissions of the secondary DSRC system in response to the instruction conveyed in the suppression notice;
wherein the secondary DSRC system is configured to enter a suspended operational state in response to the instruction conveyed in the suppression notice, wherein the secondary DSRC system suspends DSRC operations of the secondary DSRC system and does not transmit DSRC transmissions during the suspended operational state to prevent interference with DSRC transmissions of the primary DSRC system.

11. The system of claim 10, wherein the DSRC controller is further configured to initiate and conduct a negotiation session with the secondary DSRC system in response to detecting the signal from the secondary DSRC system, wherein conducting the negotiation session includes exchanging information to determine which DSRC system is to be the primary DSRC system and which DSRC system is to be the secondary DSRC system.

12. The system of claim 11, wherein the DSRC controller is further configured to transmit the suppression notice after establishment of the negotiation session.

13. The system of claim 11, wherein the negotiation session is conducted utilizing a secondary communication channel distinct from the DSRC network.

14. The system of claim 10, wherein detection of the signal from the secondary DSRC system includes detecting negotiation initiation signals and the DSRC controller is further configured to respond to negotiation initiation signals from the secondary DSRC system.

15. A primary Dedicated Short-Range Communication (DSRC) system comprising:
a DSRC transceiver configured to transmit and receive DSRC signals on a DSRC network; and
a DSRC controller configured to operate the DSRC transceiver to transmit a periodic notification signal, where the periodic notification signal conveys primacy of the primary DSRC system over another secondary DSRC system that is configured to communicate on the DSRC network;
wherein the DSRC controller is further configured to detect a secondary DSRC system operating in proximity to the primary DSRC system;
wherein the DSRC controller is further configured to transmit a suppression notice in response to detecting a secondary DSRC system, where the suppression notice conveys an instruction to the secondary DSRC system to suspend DSRC transmissions, and wherein the suppression notice comprises a time period after which the secondary DSRC system is permitted to resume DSRC transmissions.

16. The system of claim 15, wherein the DSRC controller is further configured to initiate a negotiation session with the secondary DSRC system in response to detecting the secondary DSRC system.

17. The system of claim 15, wherein the DSRC controller is further configured to communicate with the secondary DSRC system utilizing a secondary communication channel distinct from the DSRC network.

18. The system of claim 15, wherein the DSRC controller is configured to communicate with the secondary DSRC system utilizing at least one of a radio-frequency communication band, a low-power, short-range wireless communication band, and a near-field communication band.

19. The method of claim 1, after suspending DSRC transmissions of the secondary DSRC system, further comprising:
transmitting an acknowledgement signal from the secondary DSRC system to the primary DSEC system to indicate reception of the suppression notice and responsiveness to the instruction conveyed therein.

20. The method of claim 1, further comprising:
resuming DSRC transmissions at the secondary DSRC system after expiration of the time period provided in the suppression notice.

21. The system of claim 10, wherein the DSRC transceiver configured to receive an acknowledgement signal transmitted from the secondary DSRC system that indicates reception of the suppression notice and responsiveness to the instruction conveyed therein by the secondary DSRC system.

22. The system of claim 10, wherein the DSRC transceiver configured to receive, after expiration of the time period provided in the suppression notice, DSRC transmissions transmitted by the secondary DSRC system when the secondary DSRC system resumes DSRC transmissions.

* * * * *